S. C. GOODSELL & D. FRISBIE.
Hoisting Apparatus.
No. 54,467.  Patented May 1, 1866.
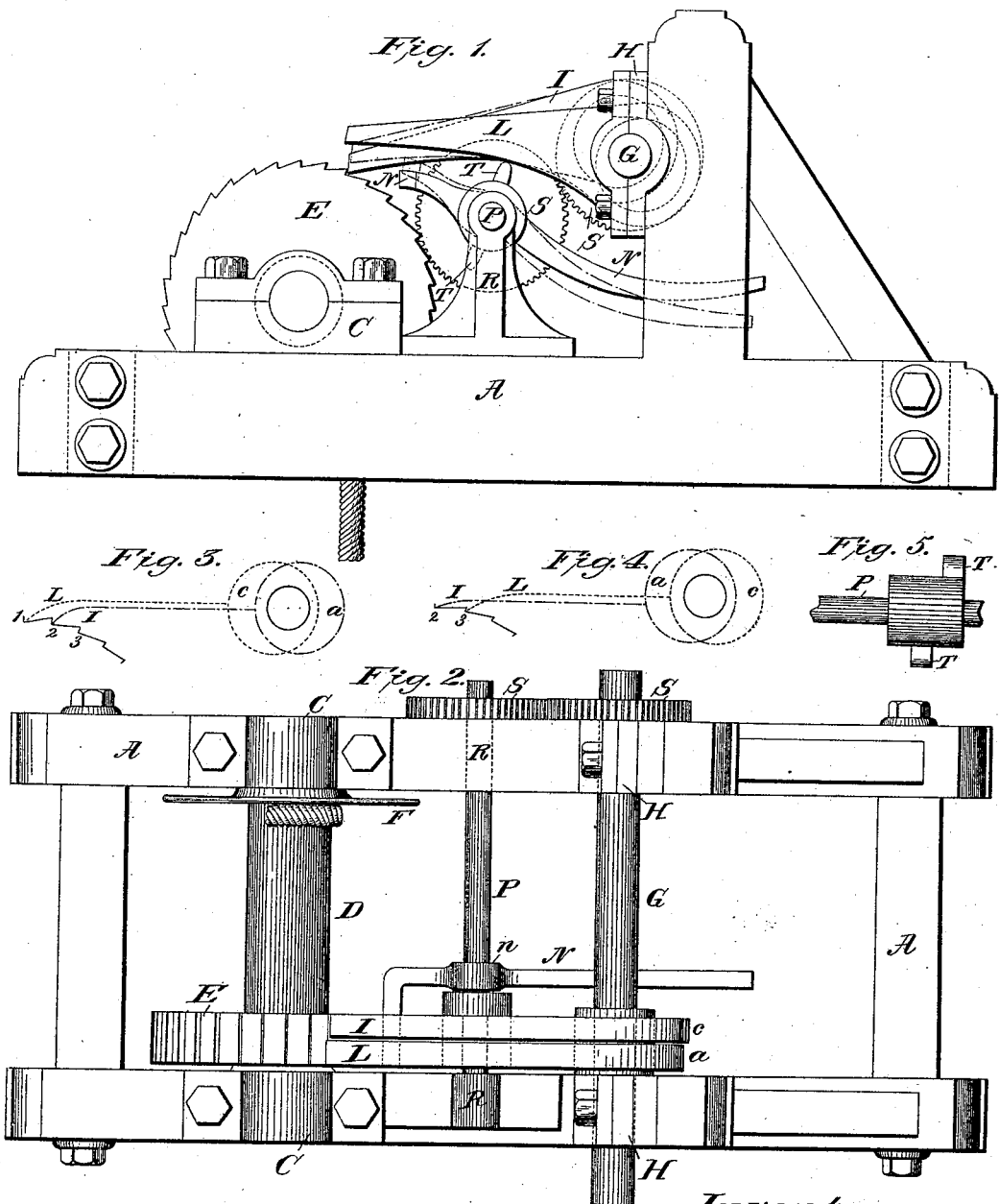

United States Patent Office.

SAMUEL C. GOODSELL AND DENNIS FRISBIE, OF NEW HAVEN, CONNECTICUT, ASSIGNORS TO THEMSELVES, H. B. BIGELOW, AND DAVID P. CALHOUN, OF SAME PLACE.

IMPROVEMENT IN HOISTING APPARATUS.

Specification forming part of Letters Patent No. 54,467, dated May 1, 1866.

*To all whom it may concern:*

Be it known that we, SAMUEL C. GOODSELL and DENNIS FRISBIE, of New Haven, in the county of New Haven and State of Connecticut, have invented a new and useful Improvement in Hoisting Apparatus; and we do hereby declare the following, when taken in connection with the accompanying drawings and the letters of reference marked thereon, to be a full, clear, and exact description of the same, and which said drawings constitute part of this specification, and represent, in—

Figure 1, a side view; Fig. 2, a top view, and in Figs. 3 and 4 diagrams to illustrate its operation.

Our invention relates to an improvement in the mechanism for operating a windlass for the purpose of hoisting, or for any purpose where a similar power is required; and it consists in the combination of two pawls acting alternately upon a ratchet, so that a stop-dog is not required, one of the pawls retreating to catch a tooth while the other advances, and in combining therewith a mechanism for operating the pawls, so as to reverse the action of the apparatus.

To enable others to construct and use our invention, we will proceed to describe the same as illustrated in the accompanying drawings.

A is a frame, upon which, in proper bearings C, the cylinder D is hung so as to revolve freely therein. Upon one end of the said cylinder is fixed a ratchet-wheel, E; upon the other end a head, F, as seen in Fig. 2.

G is a driving-shaft, supported in bearings H and caused to revolve by the application of power thereto in any convenient or known manner. Upon the said shaft G we fix two eccentrics, *a c*, set opposite to each other, as more clearly seen in Figs. 3 and 4, blue circle denoting one, and a red circle the other.

I and L are two pawls, one end forming a strap around their respective eccentrics *a* and *c*, the other formed so as to catch into a notch in the ratchet-wheel E.

The throw of the eccentrics is here shown as equal to one tooth upon the ratchet-wheel, and the pawls, as denoted by the red and blue lines in Figs. 3 and 4, of equal length.

Standing in the position as seen in Fig. 3, the pawl L, attached to the eccentric *a*, has advanced to its extreme point, carrying the tooth 1, while the pawl I has retreated to its extreme point and fallen into tooth 2. By a half-revolution of the driving-shaft the position of the two pawls will be reversed, the pawl I advancing while the pawl L retreats to the position denoted in Fig. 4, moving the ratchet-wheel forward, so that the pawl L falls into tooth 3 and prevents the return of the ratchet, and the revolution of the shaft being continued the alternate advance and retreating movement of the pawls will be performed, carrying the ratchet-wheel forward one tooth at each advance movement.

If the throw of the eccentric is made but half as great one pawl should be half a tooth shorter than the other, by which arrangement the pawls would each act upon every tooth, whereas by the arrangement first described the pawls each act upon alternate teeth. By the last arrangement the power would be proportionately increased, and by reducing the throw of the eccentric the power is proportionately increased.

To release the ratchet from the action of the pawls to allow it to return we place a lever, N, hung upon a fulcrum, *n*, beneath the pawls, so that by moving the lever from the position in black to that denoted in red, Fig. 1, the two pawls will be raised, as also denoted in red, sufficiently to release the wheel and permit its return.

P is a shaft supported and so as to revolve in bearings R, to which power is applied from the shaft G by gear-wheels S S of equal size, so that the two shafts G and P revolve at an equal velocity on the said shaft P, and beneath the pawls we fix two trips, T, (seen in Fig. 5,) one opposite to the other, and so that as the shaft revolves the two trips will act to raise first one pawl, as denoted in Fig. 1, and then the other. The driving-shaft being revolved in opposite directions to that required to raise a weight suspended to the cylinder, the ratchet-wheel will retreat with each pawl, the pawls being raised at the extreme point of their backward movement and allowed to enter the wheel at their extreme forward movement. By this operation the ratchet-wheel returns one tooth at a time, whereby the weight suspended to the cylinder may be easily and gradually lowered.

When running in the forward direction—that is, so as to raise a weight—the retreating pawls would, by their own weight, fall from each tooth with the usual click, which in many places is objectionable. By the arrangement of the trips, which operate upon the pawls the same whichever way they revolve, the pawls are lifted from the ratchet and dropped lightly into the next tooth without noise.

We have represented the ratchet-wheel as placed at one end of the cylinder and broad enough upon its face to allow the action of both pawls, which we consider the better plan for a hoisting apparatus; yet a second wheel may be placed at the other end of the cylinder, and the two pawls arranged one to operate upon each wheel, maintaining always the same relative position; or, if still greater power is required, more pawls with their own eccentrics may be added, being arranged so that the pawls would act at the proper time—that is, if four pawls are employed their eccentrics should be set at quarters; if three, at one-third, and so on.

We have illustrated our invention as for a common hoisting apparatus. We do not confine ourselves to this or for any particular purpose, as it is evident that the same arrangement may be used in various places, as for capstans, derricks, &c., and the peculiar manner in which we operate the pawls is applicable to many purposes.

Having therefore thus fully described our improvement, what we claim as new and useful, and desire to secure by Letters Patent, is—

The combination of the trip T with the two pawls I and L, when constructed and arranged to operate so that the said two pawls act to hoist or lower, substantially as and for the purpose specified.

SAMUEL C. GOODSELL.
DENNIS FRISBIE.

Witnesses:
JOHN E. EARLE,
M. A. HINE.